(12) United States Patent
Wentink (10) Patent No.: US 9,001,797 B2
(45) Date of Patent: Apr. 7, 2015

(54) SYSTEMS AND FOR REDUCING INTERFERENCE IN LONG-RANGE WIRELESS COMMUNICATION

(71) Applicant: Qualcomm Incorporated, San Diego, CA (US)

(72) Inventor: Maarten Menzo Wentink, Naarden (NL)

( * ) Notice: Subject to any disclaimer, the term of this patent is extended or adjusted under 35 U.S.C. 154(b) by 114 days.

(21) Appl. No.: 13/734,110

(22) Filed: Jan. 4, 2013

(65) Prior Publication Data

US 2014/0192784 A1 Jul. 10, 2014

(51) Int. Cl.
*H04J 3/00* (2006.01)
*H04W 24/02* (2009.01)
*H04W 28/26* (2009.01)
*H04W 84/12* (2009.01)

(52) U.S. Cl.
CPC .............. *H04W 24/02* (2013.01); *H04W 28/26* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,145,262 B2 * | 3/2012 | Martinez et al. | 455/552.1 |
| 8,355,389 B2 * | 1/2013 | Kasslin et al. | 370/338 |
| 2007/0010237 A1 * | 1/2007 | Jones et al. | 455/422.1 |
| 2007/0133447 A1 | 6/2007 | Wentink | |
| 2008/0069014 A1 | 3/2008 | Powell et al. | |
| 2010/0046488 A1 | 2/2010 | Wentink | |
| 2014/0192784 A1 * | 7/2014 | Wentink | 370/336 |

FOREIGN PATENT DOCUMENTS

WO 2012093349 A2 7/2012

* cited by examiner

*Primary Examiner* — Robert Wilson
(74) *Attorney, Agent, or Firm* — S. Hossain Beladi (57) ABSTRACT

Systems, methods, and devices for communicating a compressed beacon are described herein. In some aspects, a method of receiving a long-range communication in a wireless network is provided. The method includes transmitting, at a first device, a first communication reserving a wireless medium for at least a first time period. The first communication has a first range. The method further includes receiving, at the first device, a second communication during the first time period. The second communication is unidirectional and has a second range longer than the first range.

32 Claims, 5 Drawing Sheets

SYSTEMS AND FOR REDUCING INTERFERENCE IN LONG-RANGE WIRELESS COMMUNICATION

BACKGROUND

1. Field

The present disclosure relates generally to wireless communication systems. More specifically, the present disclosure relates to systems and methods for reducing interference in long-range wireless communication.

2. Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In some embodiments, wireless devices can be configured to communicate in a long-range (LR) physical layer (PHY) mode. A PHY mode is a PHY mode that is used to transmit from one LR station to another LR station. Such LR PHY modes may not be visible for legacy devices, which can therefore interfere with the LR transmission. In some embodiments, LR transmissions can be longer than legacy transmissions. Accordingly, legacy transmission interference can be exacerbated. Systems and methods are desired for informing legacy nodes that a long range transmission is pending.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include reducing interference in long-range wireless communication.

One aspect of the subject matter described in the disclosure provides a method of receiving a long-range communication in a wireless network. The method includes transmitting, at a first device, a first communication reserving a wireless medium for at least a first time period. The first communication has a first range. The method further includes receiving, at the first device, a second communication during the first time period. The second communication is unidirectional and has a second range longer than the first range.

Another aspect of the subject matter described in the disclosure provides a wireless device configured to receive a long-range communication in a wireless network. The device includes a transmitter configured to transmit a first communication reserving a wireless medium for at least a first time period. The first communication has a first range. The device further includes a receiver configured to receive a second communication during the first time period. The second communication is unidirectional and has a second range longer than the first range.

Another aspect of the subject matter described in the disclosure provides an apparatus for receiving a long-range communication in a wireless network. The apparatus includes means for transmitting a first communication reserving a wireless medium for at least a first time period. The first communication has a first range. The apparatus further includes means for receiving a second communication during the first time period. The second communication is unidirectional and has a second range longer than the first range.

Another aspect of the subject matter described in the disclosure provides a non-transitory computer-readable medium including code that, when executed, causes an apparatus to transmit a first communication. The first communication reserves a wireless medium for at least a first time period and has a first range. The medium further includes code that, when executed, causes the apparatus to receive a second communication. The second communication is unidirectional and has a second range longer than the first range.

DETAILED DESCRIPTION

Different wireless devices in a wireless communication system can be compliant with different standards or different variations of the same standard, such as the IEEE 802.11 standard, or they can support proprietary enhancements of a standard. When devices that are compliant with multiple versions of the IEEE 802.11 standard or that support proprietary enhancements are in the same WLAN, the devices that are compliant with older versions or that do not support the proprietary enhancements are considered to be legacy devices. To ensure backward compatibility with legacy devices, specific mechanisms can be employed to ensure that the legacy devices know when a device that is compliant with a newer version of the standard or that uses proprietary enhancements is using a wireless channel to avoid a collision. The present disclosure relates generally to preventing interference between the devices utilizing the newer 802.11 technologies and the legacy devices.

Under some circumstances, for example, IEEE 802.11 devices can utilize a long-range physical layer (PHY) mode for long-range wireless communications. However, the long-range PHY mode may not be decodable for legacy devices. In this situation, it can be desirable to inform legacy devices that a long-range transmission is pending.

The present disclosure proposes to address this problem using legacy protection frames, which can include clear-to-send (CTS) frames. With CTS frames, both a receiving LR station (STA) can transmit a legacy CTS frame prior to LR transmission. The CTS frame can clear the wireless medium for a "protected" LR transmission opportunity (TXOP), during which LR frames can be received. In some embodiments, LR STAs are configured to send LR transmissions as unidirectional transmissions. In other words, the receiving STA is not configured to immediately acknowledge (ACK) the LR transmission. In some embodiments, LR transmissions can be scheduled. In embodiments where the LR transmissions are unidirectional, LR receiver can reduce interference by clearing the region around the LR receiver from interfering transmitters.

Figure 1:
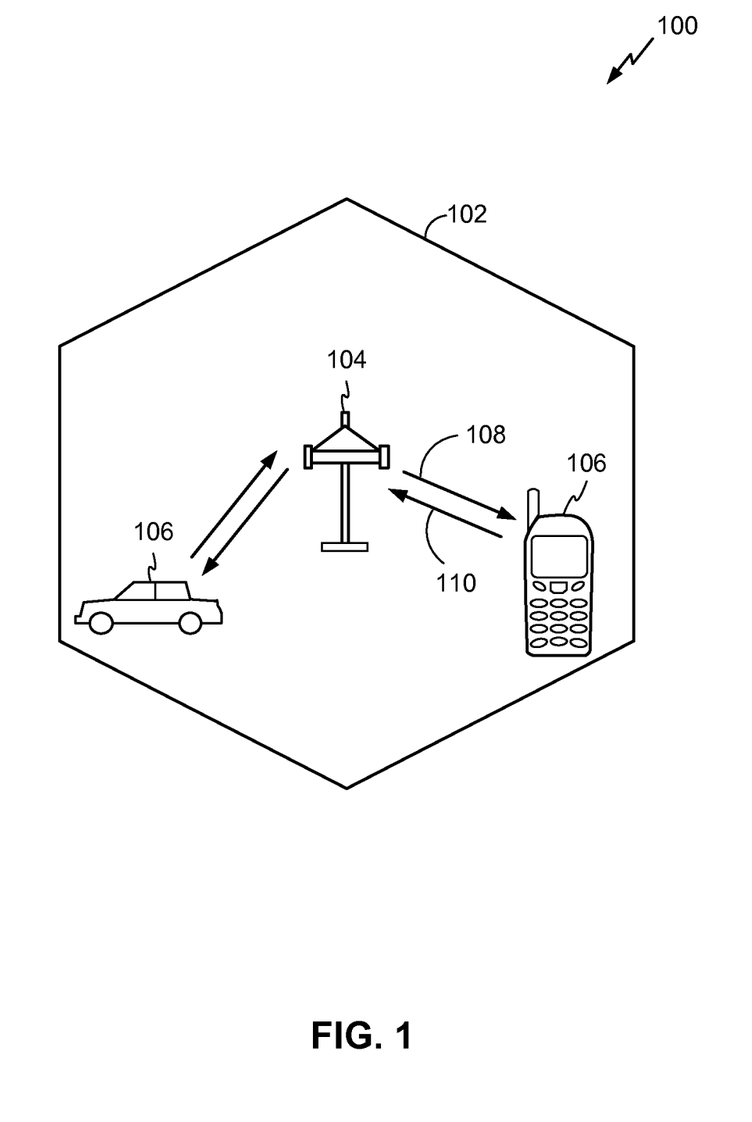
FIG. 1 illustrates an example of a wireless communication system in which aspects of the present disclosure can be employed.

FIG. 1 shows an exemplary wireless communication system 100 in which aspects of the present disclosure can be employed. The wireless communication system 100 includes an access point (AP) 104, which communicates with a plurality of stations (STAs) 106 in a basic service area (BSA) 102.

In various embodiments, the wireless communication system 100 can include a wireless local area network (WLAN). The WLAN can be used to interconnect nearby devices, employing one or more networking protocols. The various aspects described herein can apply to any communication standard, such as IEEE 802.11 wireless protocols. For example, the various aspects described herein can be used as part of the IEEE 802.11a, 802.11b, 802.11g, 802.11n, and/or 802.11ah protocols Implementations of the 802.11 protocols can be used for sensors, home automation, personal healthcare networks, surveillance networks, metering, smart grid networks, intra- and inter-vehicle communication, emergency coordination networks, cellular (e.g., 3G/4G) network offload, short- and/or long-range Internet access, machine-to-machine (M2M) communications, etc.

In some aspects, wireless signals in a sub-gigahertz band can be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol can be used for sensors, metering, and smart grid networks. Advantageously, aspects of certain devices implementing the 802.11ah protocol can consume less power than devices implementing other wireless protocols, and/or can be used to transmit wireless signals across a relatively long range, for example about one kilometer or longer.

As discussed above, certain of the devices described herein can implement the 802.11ah standard, for example. Such devices, whether used as a STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

The AP 104 can serve as a hub or base station for the wireless communication system 100. For example, the AP 104 can provide wireless communication coverage in the BSA 102. The AP 104 can include, be implemented as, or known as a NodeB, Radio Network Controller (RNC), eNodeB, Base Station Controller (BSC), Base Transceiver Station (BTS), Base Station ("BS"), Transceiver Function (TF), Radio Router, Radio Transceiver, or some other terminology.

The STAs 106 can include a variety of devices such as, for example, laptop computers, personal digital assistants (PDAs), mobile phones, etc. The STAs 106 can connect to, or associate with, the AP 104 via a WiFi (e.g., IEEE 802.11 protocol such as 802.11ah) compliant wireless link to obtain general connectivity to the Internet or to other wide area networks.

In various embodiments, the STAs 106 can include, be implemented as, or be known as access terminals (ATs), subscriber stations, subscriber units, mobile stations, remote stations, remote terminals, user terminals (UTs), terminals, user agents, user devices, user equipment (UEs), or some other terminology. In some implementations, a STA 106 can include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The AP 104, along with the STAs 106 associated with the AP 104, and that are configured to use the AP 104 for communication, can be referred to as a basic service set (BSS). In some embodiments, the wireless communication system 100 may not have a central AP 104. For example, in some embodiments, the wireless communication system 100 can function as a peer-to-peer network between the STAs 106. Accordingly, the functions of the AP 104 described herein can alternatively be performed by one or more of the STAs 106. Moreover the AP 104 can implement one or more aspects described with respect to the STAs 106, in some embodiments.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

A variety of processes and methods can be used for transmissions in the wireless communication system 100 between the AP 104 and the STAs 106. In some aspects, wireless signals can be transmitted using orthogonal frequency-division multiplexing (OFDM), direct-sequence spread spectrum (DSSS) communications, a combination of OFDM and DSSS communications, or other schemes. For example, signals can be sent and received between the AP 104 and the STAs 106 in accordance with OFDM/OFDMA processes. Accordingly, the wireless communication system 100 can be referred to as an OFDM/OFDMA system. As another example, signals can be sent and received between the AP 104 and the STAs 106 in accordance with CDMA processes. Accordingly, the wireless communication system 100 can be referred to as a CDMA system.

Aspects of certain devices (such as the AP 104 and the STAs 106) implementing such protocols can consume less power than devices implementing other wireless protocols. The devices can be used to transmit wireless signals across a relatively long range, for example about one kilometer or longer. For example, as discussed above, certain of the devices described herein can implement the 802.11ah standard, for example. Such devices, whether used as a STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

Figure 2:
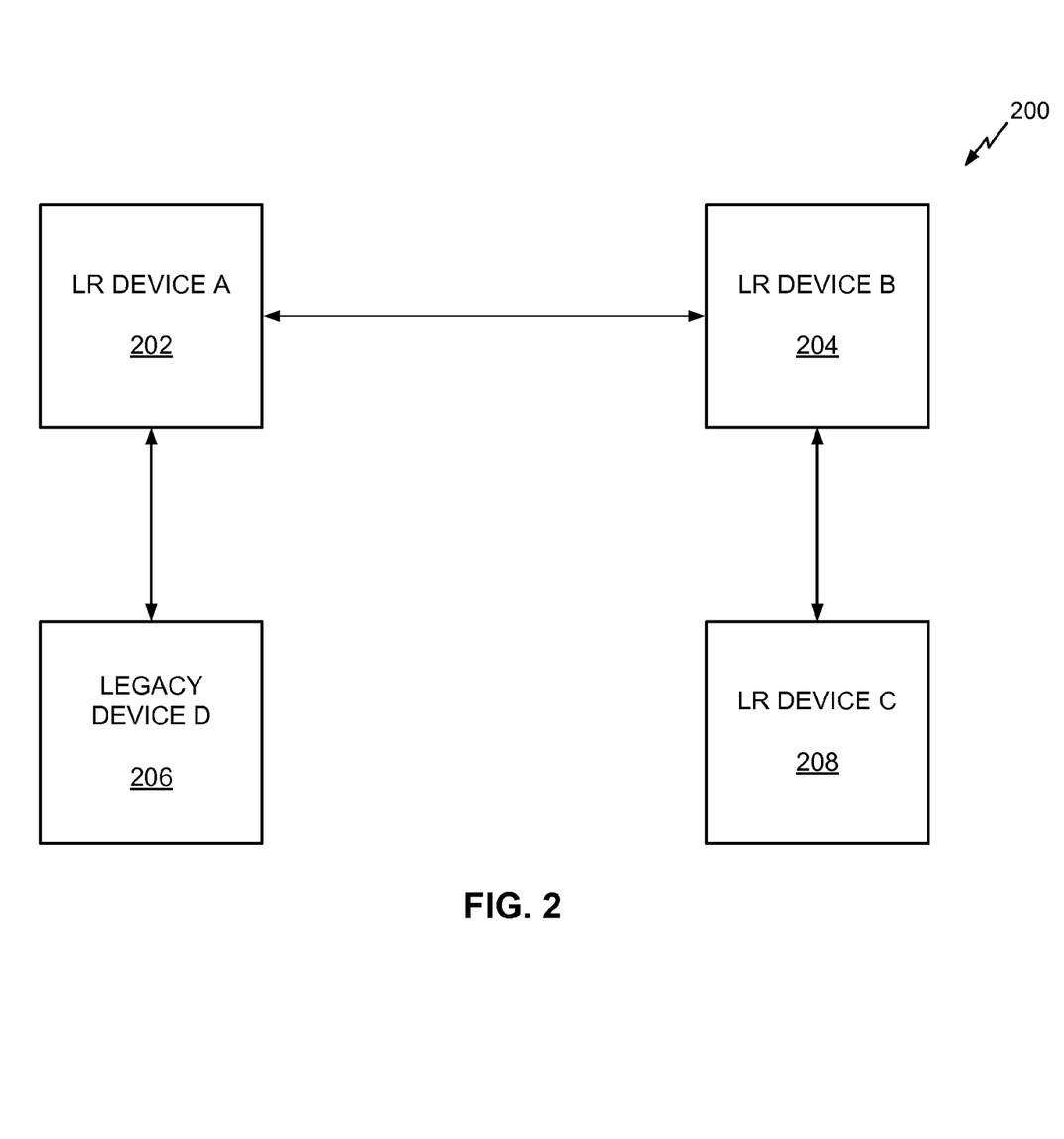
FIG. 2 illustrates an example of another wireless communication system in which aspects of the present disclosure can be employed.

FIG. 2 illustrates an example of another wireless communication system 200 in which aspects of the present disclosure can be employed. As illustrated, the wireless system 220 includes two long range (LR) devices 202 and 204, and two legacy devices 206 and 208. The LR device 202 is in wireless electronic communication with a legacy device D 206, and within the communication range of legacy device D 106. The LR device 102 is in long range wireless electronic communication with another LR device 204. The LR device 204 is in wireless electronic communication with a legacy device 208 and within the communication range of legacy device 208. Although not shown, the system 200 can include more than the two LR devices 202 and 204 shown in FIG. 2. Furthermore, although not shown, each of the LR devices 202 and 204 can be in electronic communication with more than one legacy device 206 and 208.

The LR devices 202 and 204 can be access points (AP) or subscriber stations (STA). For example, the LR device 202 can be an access point and the LR device 104 can be a subscriber station. As another example, the LR device 202 can be a subscriber station and the LR device 104 can also be a subscriber station. As a third example, the LR device 202 can be an access point and the LR device 204 can also be an access point. The legacy devices 206 and 208 are devices that are not capable of long range electronic communication 203, and can be access points, subscriber stations, or a combination thereof. In various embodiments, the devices 202, 204, 206, and 208 can be any of the AP 104 (FIG. 1) and/or STAs 106 (FIG. 1).

The LR device 202 and/or 204 can communicate with each of the legacy devices 206 and/or 208 that are within range of the LR device 202 and/or 204. For example, the LR device 202 can communicate with the legacy device D 106 that is within range of the LR device 102 but may not communicate with the legacy device 208 if the legacy device 108 is outside of the range of the LR device 202.

Figure 3:
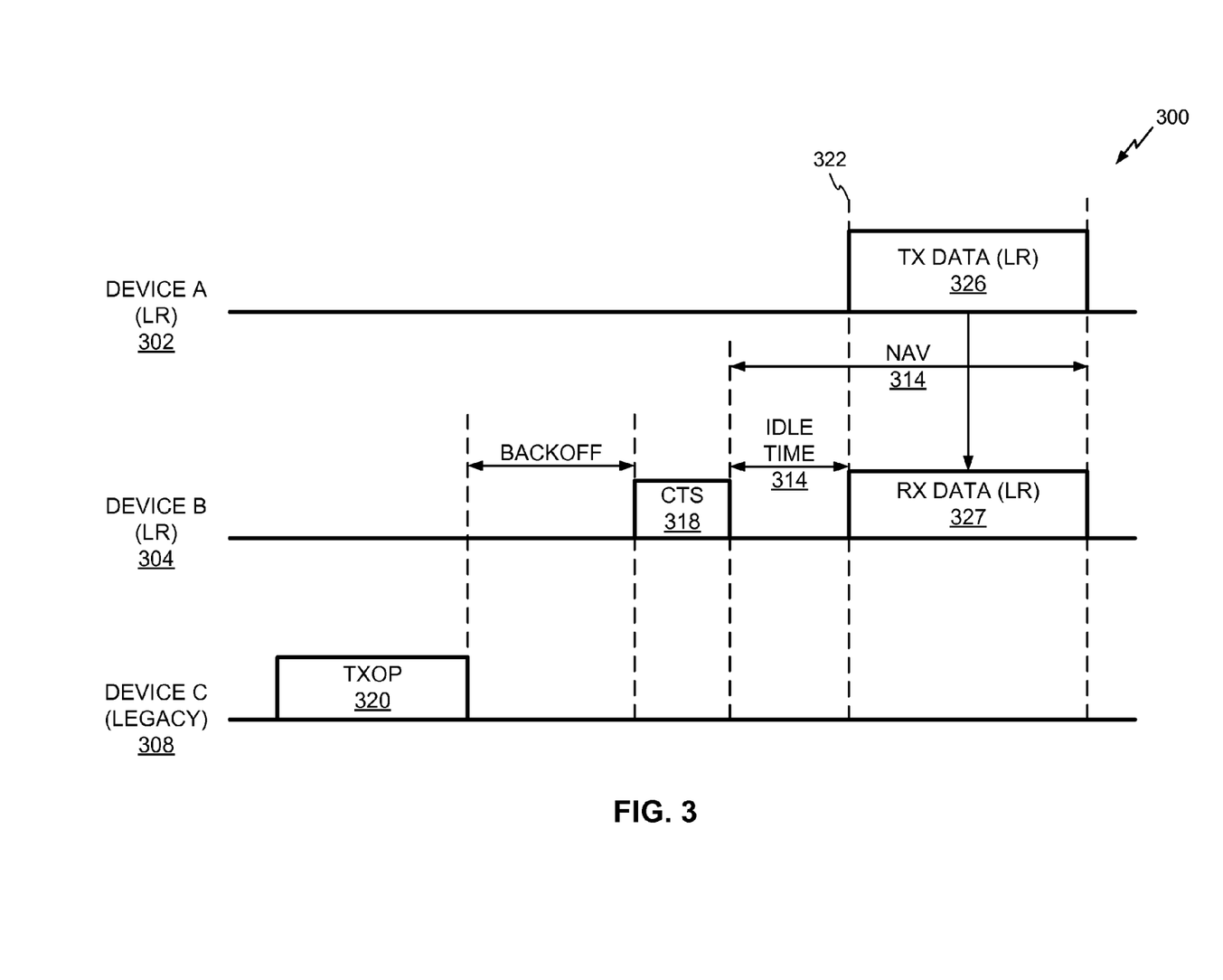
FIG. 3 shows an exemplary transmission scheme that can be used in the wireless system of FIGS. 1 and/or 2.

FIG. 3 shows an exemplary transmission scheme 300 that can be used in the wireless system 100 and/or 200 of FIGS. 1 and/or 2. As illustrated, the transmission scheme 300 involves an LR device 302, an LR device 304, and a legacy device 308. In various embodiments, the LR device 302 and the LR device 304 can include the LR device 202 (FIG. 2), the LR device 204 (FIG. 2), the AP 104 (FIG. 1), and/or any of the STAs 106 (FIG. 1). The legacy device 308 can include the AP 104 or any of the STAs 106.

In the illustrated embodiment, the device 308 is only within range of communicating with the LR device 304. The LR device 302 can be scheduled to transmit data 326 at a time 322. In some embodiments, the time 322 can be scheduled. The scheduled LR transmission time 322 can be predetermined by either the LR device 302, the LR device 304, or both. The scheduled LR transmission time 322 can also be provided to the LR device 302 and the LR device 304 by another device (not shown), or the scheduled LR transmission time 322 can be manually set. In an embodiment, the LR device 302 can transmit the data 322 unidirectionally. For example, in various embodiments, the LR device 304 may not transmit an ACK immediately, can transmit a block ACK, and may not otherwise transmit to the LR device 302.

At the scheduled LR transmission time 322 there can also be a pending LR data transmission 326. The LR data transmission 326 can occur between two or more LR devices 302 and 304. In FIG. 3, the LR data transmission 326 is from the LR device 302 to the LR device 304. The legacy device 308 can be unaware of the pending LR data transmission 326. As such, the legacy device 308 can attempt to communicate with the LR device 302 while the LR data transmission 326 occurs. Alternatively, the legacy device 308 can attempt to communicate with other devices within the range of the LR device 304 during the LR data transmission 326. Such attempts to communicate can cause a collision and a possible failure to the LR data transmission 326.

Prior to the scheduled LR transmission time 322, the LR device 304 can send a clear-to-send (CTS) frame 318 that can be received by the legacy device 308 within range. The CTS frame 318 can be a legacy CTS frame that a legacy device 308 can receive and interpret. The CTS 318 can define a network allocation vector (NAV) 324 for the legacy device 308 that defines a time frame during which the legacy device 308 should not communicate. The NAV 324 can define the time frame needed to complete both the LR data transmission 326. The NAV 324 can be shorter than alternative implementations that use immediate ACKs, because the LR device 304 may not be configured to transmit an ACK immediately. Thus, the LR device 304 can send a CTS frame 318 to the legacy device 308 to indicate the pending LR data transmission 326.

The legacy device 308 can be in electronic communication prior to the scheduled LR transmission time 322. For example, the illustrated legacy device 308 is participating in a transmission opportunity (TXOP) 320 prior to the scheduled LR transmission time 322 occurs. Because the legacy device 308 is in electronic communication, the LR device 304 can wait until the TXOP 320 has finished before sending the CTS 318 to avoid a collision with the TXOP 320.

Thus, when the TXOP 320 that the legacy device 308 is participating in has finished, the LR device 304 can wait the requisite backoff time 312 and then send the CTS frame 318. As discussed above, the CTS frame 318 can be received by one or more legacy devices 308 that are within range of the LR device 304. Thus, the CTS frame 318 sent from the LR device 304 can be received by the legacy device 308 along with other wireless devices within range of the LR device 304.

Once a CTS frame 316, 318 has been sent, an LR device 302 and/or 304 can wait an idle time 314 until the scheduled transmission time 322. At the scheduled transmission time 322, the LR data transmission 326 can begin. During the LR data transmission 326, the LR device 302 can transmit data to the LR device 304 via an LR signal. The receiving LR device 304 can refrain from sending an LR ACK upon receiving the completed LR data transmission 326. The LR data transmission 326 and can finish during the defined NAV 324 in order to avoid collision avoidance from legacy devices 308.

If the LR device 204 fails to complete sending the CTS frame 318 prior to the scheduled LR transmission time 322, the LR data transmission 326 can fail. For example, if the LR device 304 fails to complete the sending of the CTS frame 318 to the legacy device 308 before the expiration of the fixed time 310, the LR device 302 can begin sending the LR data transmission 326 and the legacy device 308 can attempt to communicate during the LR data transmission 326, thereby causing a collision. The amount of lead time, prior to the scheduled LR transmission time 322, that the LR device 304 attempts to transmit the CTS 318 can be adjusted statically or dynamically to optimally allow the LR device 304 to complete the transmission of the CTS frames 318 before the scheduled LR transmission time 322. The lead time can also be adjusted to avoid long and wasteful idle times 314, during which no transmissions 326 occur.

Figure 4:
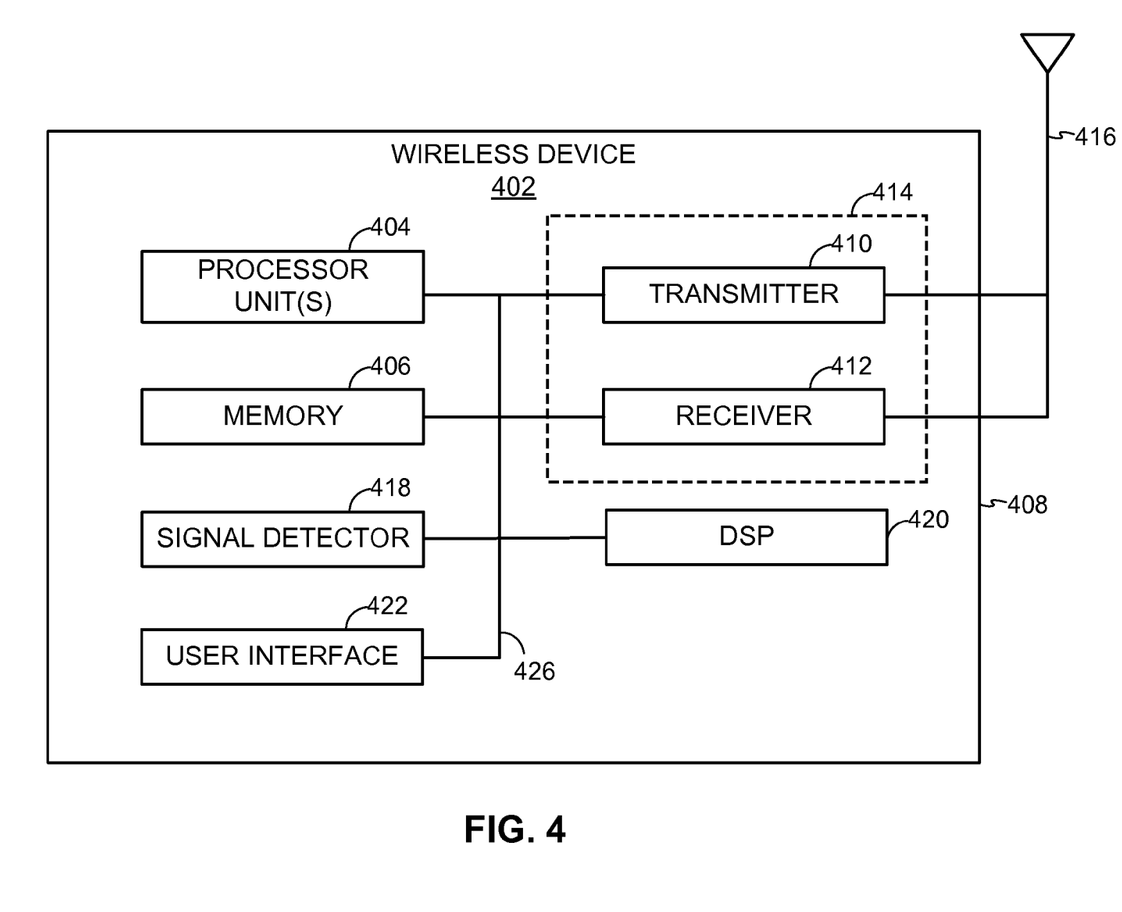
FIG. 4 shows a functional block diagram of an exemplary a wireless device that can be employed within the wireless communication system of FIGS. 1 and/or 2.

FIG. 4 shows a functional block diagram of an exemplary a wireless device 402 that can be employed within the wireless communication system 100 and/or 200 of FIGS. 1 and/or 2. The wireless device 402 is an example of a device that can be configured to implement the various methods described herein. For example, the wireless device 402 can include the AP 104 and/or one of the STAs 106.

The wireless device 402 can include one or more processor units 404 which are configured to control operation of the wireless device 402. One or more of the processor units 404 can be collectively referred to as a central processing unit (CPU). A memory 406, which can include both read-only memory (ROM) and random access memory (RAM), provides instructions and data to the processor units 404. A portion of the memory 406 can also include non-volatile random access memory (NVRAM). The processor units 404 can be configured to perform logical and arithmetic operations based on program instructions stored within the memory 406. The processor 404 can be configured to implement one or more methods described herein, for example in conjunction with executable instructions in the memory 406.

The processor units 404 can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor units 404 include a DSP, the DSP can be configured to generate a packet (e.g., a data packet) for transmission. In some aspects, the packet can include a physical layer data unit (PPDU).

The wireless device 402 can also include machine-readable media for storing software. The processing units 404 can include one or more machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the processor units 404, cause the wireless device 402 to perform the various functions described herein.

The wireless device 402 can include a transmitter 410 and/or a receiver 412 to allow transmission and reception, respectively, of data between the wireless device 402 and a remote location. The transmitter 410 and receiver 412 can be combined into a transceiver 414. An antenna 416 can be attached to the housing 408 and electrically coupled with the transceiver 414. The wireless device 402 can also include (not shown) multiple transmitters, multiple receivers, multiple transceivers, and/or multiple antennas.

The transmitter 410 can be configured to wirelessly transmit packets and/or signals. For example, the transmitter 410 can be configured to transmit different types of packets generated by the processor units 404, discussed above. The packets are made available to the transmitter 401. For example, the processor units 404 can store a packet in the memory 406 and the transmitter 401 can be configured to retrieve the packet. Once the transmitter retrieves the packet, the transmitter 401 transmits the packet to a STA 106 wireless device 402 via the antenna 416.

An antenna 416 on the STA 106 wireless device 402 detects wirelessly transmitted packets/signals. The STA 106 receiver 412 can be configured to process the detected packets/signals and make them available to the processor units 404. For example, the STA 106 receiver 412 can store the packet in memory 406 and the processor units 404 can be configured to retrieve the packet.

The wireless device 402 can also include a signal detector 418 that can be used in an effort to detect and quantify the level of signals received by the transceiver 414. The signal detector 418 can detect such signals as total energy, energy per subcarrier per symbol, power spectral density, and other signals. The wireless device 402 can also include a digital signal processor (DSP) 420 for use in processing signals. The DSP 420 can be configured to generate a packet for transmission. In some aspects, the packet can include a physical layer data unit (PPDU).

The wireless device 402 can further include a user interface 422 in some aspects. The user interface 422 can include a keypad, a microphone, a speaker, and/or a display. The user interface 422 can include any element or component that conveys information to a user of the wireless device 402 and/or receives input from the user. The wireless device 402 can also include a housing 408 surrounding one or more of the components included in the wireless device 402.

The various components of the wireless device 402 can be coupled together by a bus system 426. The bus system 426 can include a data bus, for example, as well as a power bus, a control signal bus, and a status signal bus in addition to the data bus. Those of skill in the art will appreciate the components of the wireless device 402 can be coupled together or accept or provide inputs to each other using some other mechanism.

Although a number of separate components are illustrated in FIG. 4, those of skill in the art will recognize that one or more of the components can be combined or commonly implemented. For example, the processor units 404 can be used to implement not only the functionality described above with respect to the processor units 404, but also to implement the functionality described above with respect to the signal detector 418. Further, each of the components illustrated in FIG. 4 can be implemented using a plurality of separate elements.

Figure 5:
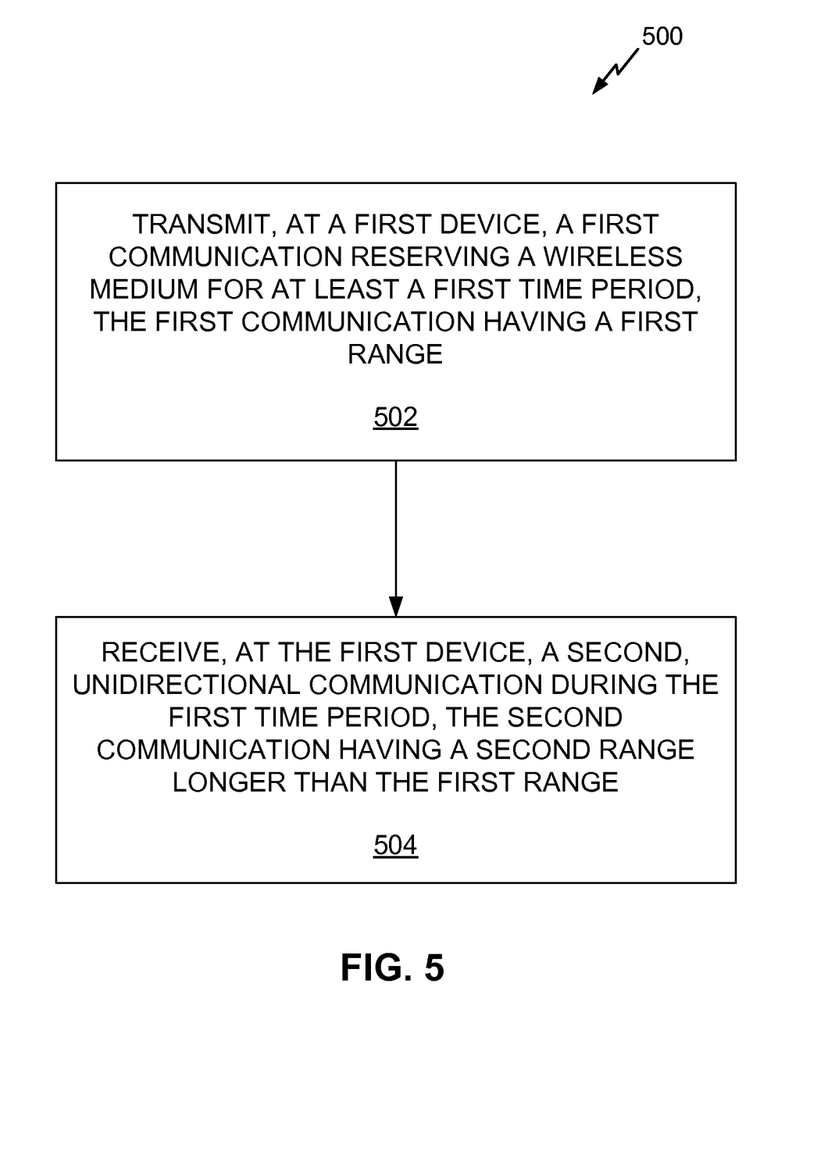
FIG. 5 shows a flowchart 500 for an exemplary method of wireless communication that can be employed within the wireless communication system of FIGS. 1 and/or 2.

FIG. 5 shows a flowchart 500 for an exemplary method of wireless communication that can be employed within the wireless communication system 100 and/or 200 of FIGS. 1 and/or 2. The illustrated method can reduce signaling during link setup in a wireless communication system. The method can be implemented in whole or in part by the devices described herein, such as the wireless device 402 shown in FIG. 4. Although the illustrated method is described herein with reference to the wireless communication systems 100 and 200 discussed above with respect to FIGS. 1 and 2, the transmissions scheme 300 discussed above with respect to FIG. 3, and the wireless device 402 discussed above with respect to FIG. 4, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

First, at block 502, the LR device 304 transmits a first communication reserving a wireless medium for at least a first time period. The first communication has a first range. For example, the LR device 304 can transmit the CTS 318. The LR device 304 can wait for the legacy device 308 to stop transmitting during a TXOP 320. The LR device 304 can wait for a backoff period after the legacy device 308 stops transmitting.

In an embodiment, the CTS frame 318 can be configured to set a network allocation vector (NAV) that starts before a scheduled time of the long-range communication, and ends at a scheduled end time of the long-range communication. For example, the CTS frame 318 can set the NAV 314 starting before the LR data transmission 326 commences and ending after the LR data transmission 326 ends.

In an embodiment, the LR device 304 and/or the LR device 302 can schedule a second communication. For example, the LR devices 304 and/or 302 can determine a time for the LR data transmission 326. Particularly, the LR devices 304 and/or 302 can determine a scheduled start time 322 of the LR data transmission 326. The CTS frame 318 can be based on the determined start time 322. Likewise, the LR devices 304 and/or 302 can determine a scheduled end time of the LR data transmission 326. The CTS frame 318 can be based on the determined end time.

Next, at block 504, the LR device 304 receives a second, unidirectional communication during the first time period. The second communication having a second range longer than the first range. For example, the LR device 304 can receive the LR data transmission 326 during the NAV 314. The LR data transmission 326 can be unidirectional.

In an embodiment, the LR device 304 can delay an acknowledgment of the second communication. For example, the LR device 304 can refrain from acknowledging the LR data transmission altogether. In another example, the LR device 304 can wait to transmit the acknowledgement. In another example, the LR device 304 can transmit a block ACK. In an embodiment, the LR data transmission 326 can include a data media access control (MAC) protocol data unit (D-MPDU).

In an embodiment, the method shown in FIG. 5 can be implemented in a wireless device that can include means for transmitting and means for receiving. Those skilled in the art will appreciate that a wireless device may have more components than the simplified wireless device described herein. The wireless device described herein includes only those components useful for describing some prominent features of implementations within the scope of the claims.

The means for transmitting can be configured to transmit the first communication reserving the wireless medium for at least the first time period. For example, the means for transmitting can implement block 502, discussed above. The means for transmitting can include one or more of the antenna 416 (FIG. 4), a signal generator, a power source, an amplifier, the transmitter 410 (FIG. 4), and the memory 406 (FIG. 4). In some implementations, means for transmitting can include a transmitting circuit.

The means for receiving can be configured to receive the second communication. For example, the means for receiving can implement block 504, discussed above. The receiving circuit can include one or more of the receiver 412 (FIG. 4), the antenna 416 (FIG. 4), the processor 404 (FIG. 4), and the memory 406 (FIG. 4). In some implementations, the means for receiving can include a receiving circuit.

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Further, a "channel width" as used herein can encompass or can also be referred to as a bandwidth in certain aspects.

Various aspects of the novel systems, apparatuses, and methods are described above with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above should also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

The functions described can be implemented in hardware, software, firmware or any combination thereof. If implemented in software, the functions can be stored as one or more instructions on a computer-readable medium. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects can include a computer program product for performing the operations presented herein. For example, such a computer program product can include a computer readable medium having instructions stored (and/or encoded) thereon, the instructions being executable by one or more processors to perform the operations described herein. For certain aspects, the computer program product can include packaging material.

Software or instructions can also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

The invention claimed is:

1. A method of receiving a long-range communication in a wireless network, the method comprising:
    transmitting, at a first device, a first communication reserving a wireless medium for at least a first time period, the first communication having a first range; and
    receiving, at the first device, a second, unidirectional communication during the first time period, the second communication having a second range longer than the first range,
    wherein the first communication is configured to set a network allocation vector (NAV) that starts before a scheduled time of the second communication, and ends at a scheduled end time of the second communication.

2. The method of claim 1, wherein the first communication, reserving the wireless medium for a first time period, comprises a clear-to-send (CTS) frame.

3. The method of claim 1, further comprising scheduling the second communication.

4. The method of claim 1, further comprising determining a scheduled start time of the second communication, wherein the first communication reserving the wireless medium is based on the determined start time.

5. The method of claim 1, further comprising determining a scheduled end time of the second communication, wherein the first communication reserving the wireless medium is based on the determined end time.

6. The method of claim 1, further comprising delaying an acknowledgment of the second communication.

7. The method of claim 1, further comprising transmitting a block acknowledgement of the second communication.

8. The method of claim 1, wherein the second communication comprises a data media access control (MAC) protocol data unit (D-MPDU).

9. A wireless device configured to receive a long-range communication in a wireless network, the wireless device comprising:
a transmitter configured to transmit a first communication reserving a wireless medium for at least a first time period, the first communication having a first range; and
a receiver configured to receive a second, unidirectional communication during the first time period, the second communication having a second range longer than the first range,
wherein the first communication is configured to set a network allocation vector (NAV) that starts before a scheduled time of the second communication, and ends at a scheduled end time of the second communication.

10. The wireless device of claim 9, wherein the first communication, reserving the wireless medium for a first time period, comprises a clear-to-send (CTS) frame.

11. The wireless device of claim 9, further comprising a processor configured to schedule the second communication.

12. The wireless device of claim 9, further comprising a processor configured to determine a scheduled start time of the second communication, wherein the first communication reserving the wireless medium is based on the determined start time.

13. The wireless device of claim 9, further comprising a processor configured to determine a scheduled end time of the second communication, wherein the first communication reserving the wireless medium is based on the determined end time.

14. The wireless device of claim 9, further comprising a processor configured to delay an acknowledgment of the second communication.

15. The wireless device of claim 9, wherein the transmitter is further configured to transmit a block acknowledgement of the second communication.

16. The wireless device of claim 9, wherein the second communication comprises a data media access control (MAC) protocol data unit (D-MPDU).

17. An apparatus for receiving a long-range communication in a wireless network, the apparatus comprising:
means for transmitting a first communication reserving a wireless medium for at least a first time period, the first communication having a first range; and
means for receiving a second, unidirectional communication during the first time period, the second communication having a second range longer than the first range,
wherein the first communication is configured to set a network allocation vector (NAV) that starts before a scheduled time of the second communication, and ends at a scheduled end time of the second communication.

18. The apparatus of claim 17, wherein the first communication, reserving the wireless medium for a first time period, comprises a clear-to-send (CTS) frame.

19. The apparatus of claim 17, further comprising means for scheduling the second communication.

20. The apparatus of claim 17, further comprising means for determining a scheduled start time of the second communication, wherein the first communication reserving the wireless medium is based on the determined start time.

21. The apparatus of claim 17, further comprising means for determining a scheduled end time of the second communication, wherein the first communication reserving the wireless medium is based on the determined end time.

22. The apparatus of claim 17, further comprising means for delaying an acknowledgment of the second communication.

23. The apparatus of claim 17, further comprising means for transmitting a block acknowledgement of the second communication.

24. The apparatus of claim 17, wherein the second communication comprises a data media access control (MAC) protocol data unit (D-MPDU).

25. A non-transitory computer-readable medium comprising code that, when executed, causes an apparatus to:
transmit a first communication reserving a wireless medium for at least a first time period, the first communication having a first range; and
receive a second, unidirectional communication during the first time period, the second communication having a second range longer than the first range,
wherein the first communication is configured to set a network allocation vector (NAV) that starts before a scheduled time of the second communication, and ends at a scheduled end time of the second communication.

26. The non-transitory computer-readable medium of claim 25, wherein the first communication, reserving the wireless medium for a first time period, comprises a clear-to-send (CTS) frame.

27. The non-transitory computer-readable medium of claim 25, further comprising code that, when executed, causes the apparatus to schedule the second communication.

28. The non-transitory computer-readable medium of claim 25, further comprising code that, when executed, causes the apparatus to determine a scheduled start time of the second communication, wherein the first communication reserving the wireless medium is based on the determined start time.

29. The non-transitory computer-readable medium of claim 25, further comprising code that, when executed, causes the apparatus to determine a scheduled end time of the second communication, wherein the first communication reserving the wireless medium is based on the determined end time.

30. The non-transitory computer-readable medium of claim 25, further comprising code that, when executed, causes the apparatus to delay an acknowledgment of the second communication.

31. The non-transitory computer-readable medium of claim 25, further comprising code that, when executed, causes the apparatus to transmit a block acknowledgement of the second communication.

32. The non-transitory computer-readable medium of claim 25, wherein the second communication comprises a data media access control (MAC) protocol data unit (D-MPDU).

* * * * *